(12) United States Patent
Nishiwaki

(10) Patent No.: US 8,345,093 B2
(45) Date of Patent: Jan. 1, 2013

(54) METHOD FOR ADJUSTING LIGHTNESS OF IMAGE OBTAINED BY MICROSCOPE

(75) Inventor: Daisuke Nishiwaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 462 days.

(21) Appl. No.: 12/579,638

(22) Filed: Oct. 15, 2009

(65) Prior Publication Data

US 2010/0103255 A1    Apr. 29, 2010

(30) Foreign Application Priority Data

Oct. 24, 2008   (JP) ................................ 2008-274648

(51) Int. Cl.
 *H04N 7/18*        (2006.01)
 *G06K 9/00*        (2006.01)
 *H04N 9/47*        (2006.01)
 *H04N 5/243*       (2006.01)

(52) U.S. Cl. ............ 348/79; 348/80; 382/128; 382/276; 359/385; 359/386; 359/387; 359/388; 359/389; 359/390

(58) Field of Classification Search .................... 348/79, 348/80; 382/128, 276; 359/385–390
See application file for complete search history.

(56) References Cited

U.S. PATENT DOCUMENTS

| | | | |
|---|---|---|---|
| 4,958,920 A | 9/1990 | Jorgens et al. | |
| 7,027,221 B2 | 4/2006 | Hamborg | |
| 7,141,773 B2 | 11/2006 | Kaplan et al. | |
| 7,393,321 B2 * | 7/2008 | Doguchi et al. | 600/109 |
| 7,573,499 B2 * | 8/2009 | Doguchi et al. | 348/65 |
| 7,825,360 B2 * | 11/2010 | Karasawa et al. | 250/201.2 |
| 7,889,228 B2 * | 2/2011 | Ishihara et al. | 348/65 |
| 8,021,295 B2 * | 9/2011 | Morishita et al. | 600/159 |
| 8,021,356 B2 * | 9/2011 | Uchiyama et al. | 604/890.1 |
| 8,038,605 B2 * | 10/2011 | Tsuji et al. | 600/152 |
| 2004/0238731 A1 * | 12/2004 | Nishiyama et al. | 250/234 |
| 2004/0257438 A1 * | 12/2004 | Doguchi et al. | 348/65 |
| 2005/0010081 A1 * | 1/2005 | Doguchi et al. | 600/109 |
| 2005/0148847 A1 * | 7/2005 | Uchiyama et al. | 600/407 |
| 2006/0025692 A1 * | 2/2006 | Ishihara | 600/478 |
| 2007/0002134 A1 * | 1/2007 | Ishihara et al. | 348/65 |
| 2007/0153542 A1 * | 7/2007 | Gono et al. | 362/574 |
| 2007/0173694 A1 * | 7/2007 | Tsuji et al. | 600/146 |
| 2007/0213588 A1 * | 9/2007 | Morishita et al. | 600/156 |
| 2007/0213593 A1 * | 9/2007 | Nakaoka | 600/181 |
| 2007/0270652 A1 * | 11/2007 | Morishita et al. | 600/178 |
| 2008/0094616 A1 * | 4/2008 | Tanaka | 356/237.2 |
| 2008/0226156 A1 * | 9/2008 | Ota | 382/141 |
| 2008/0310016 A1 * | 12/2008 | Karasawa et al. | 359/383 |
| 2009/0073552 A1 * | 3/2009 | Yokoi | 359/372 |
| 2009/0080722 A1 * | 3/2009 | Okugawa et al. | 382/128 |
| 2010/0053736 A1 * | 3/2010 | Okugawa | 359/363 |

FOREIGN PATENT DOCUMENTS

JP         9-138353 A       5/1997

* cited by examiner

*Primary Examiner* — Haresh N Patel
(74) *Attorney, Agent, or Firm* — Holtz, Holtz, Goodman & Chick, PC

(57) ABSTRACT

The automatic adjustment method of a microscopic image for automatically adjusting an image on the basis of the lightness of the microscopic image includes distinguishing an observation pixel being an observation target in the image from a non-observation pixel not being an observation target on the basis of the lightness of each pixel of the image, determining a representative value for representing the lightness of the image on the basis of the lightness of a selection pixel identified as the observation pixel and adjusting the lightness of the image on the basis of the representative value.

13 Claims, 14 Drawing Sheets

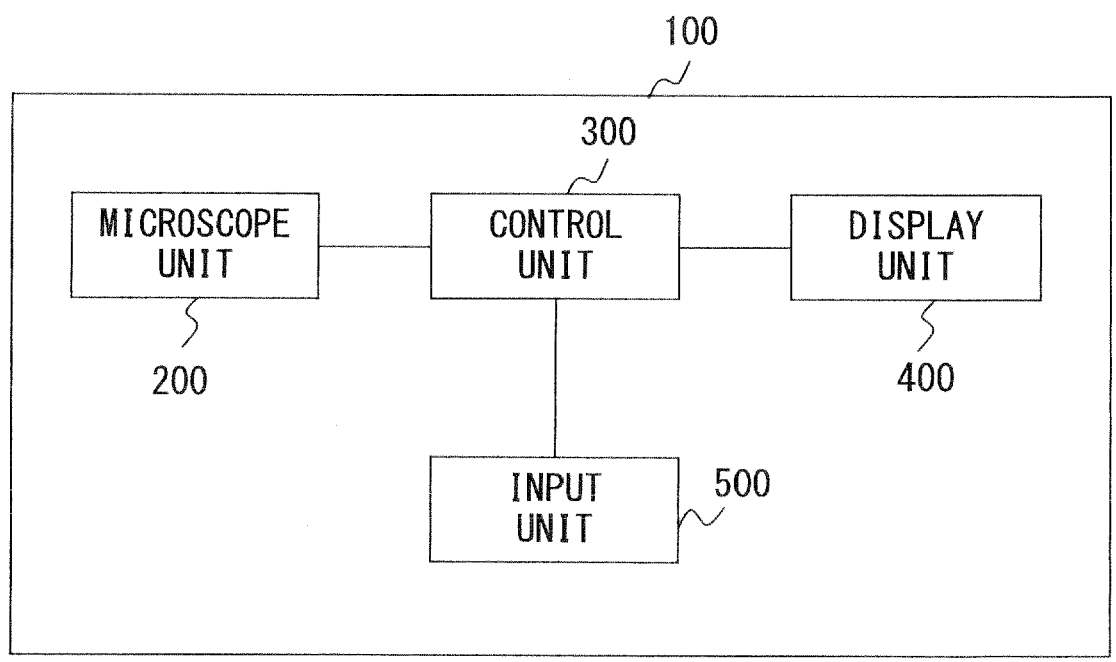
F I G. 1

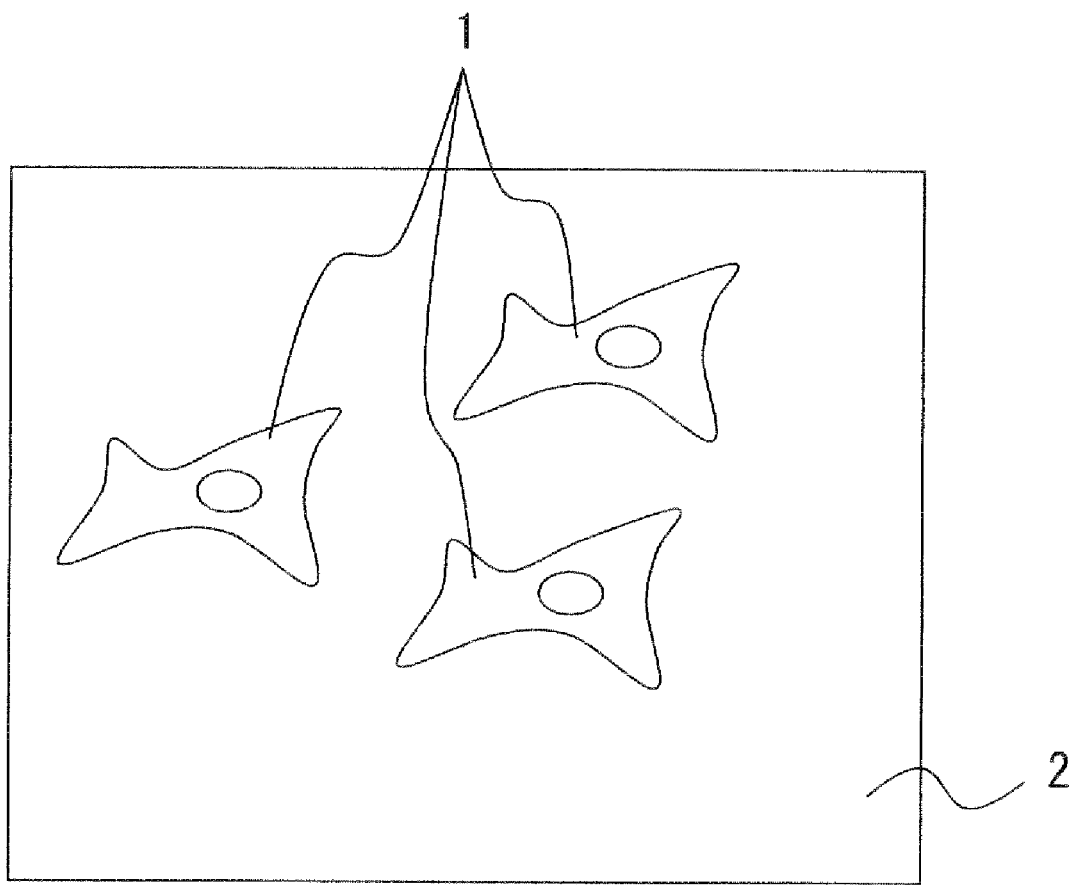
F I G. 2

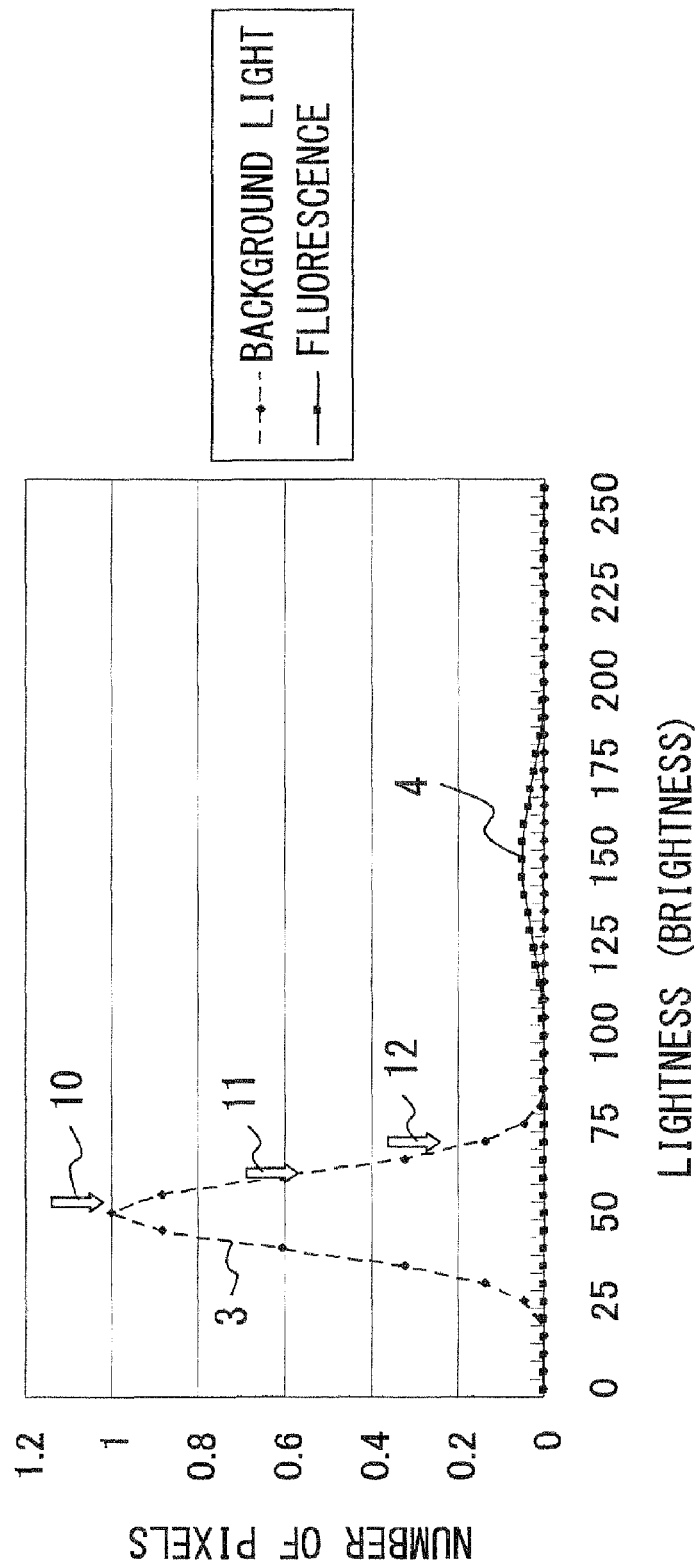
F I G. 4

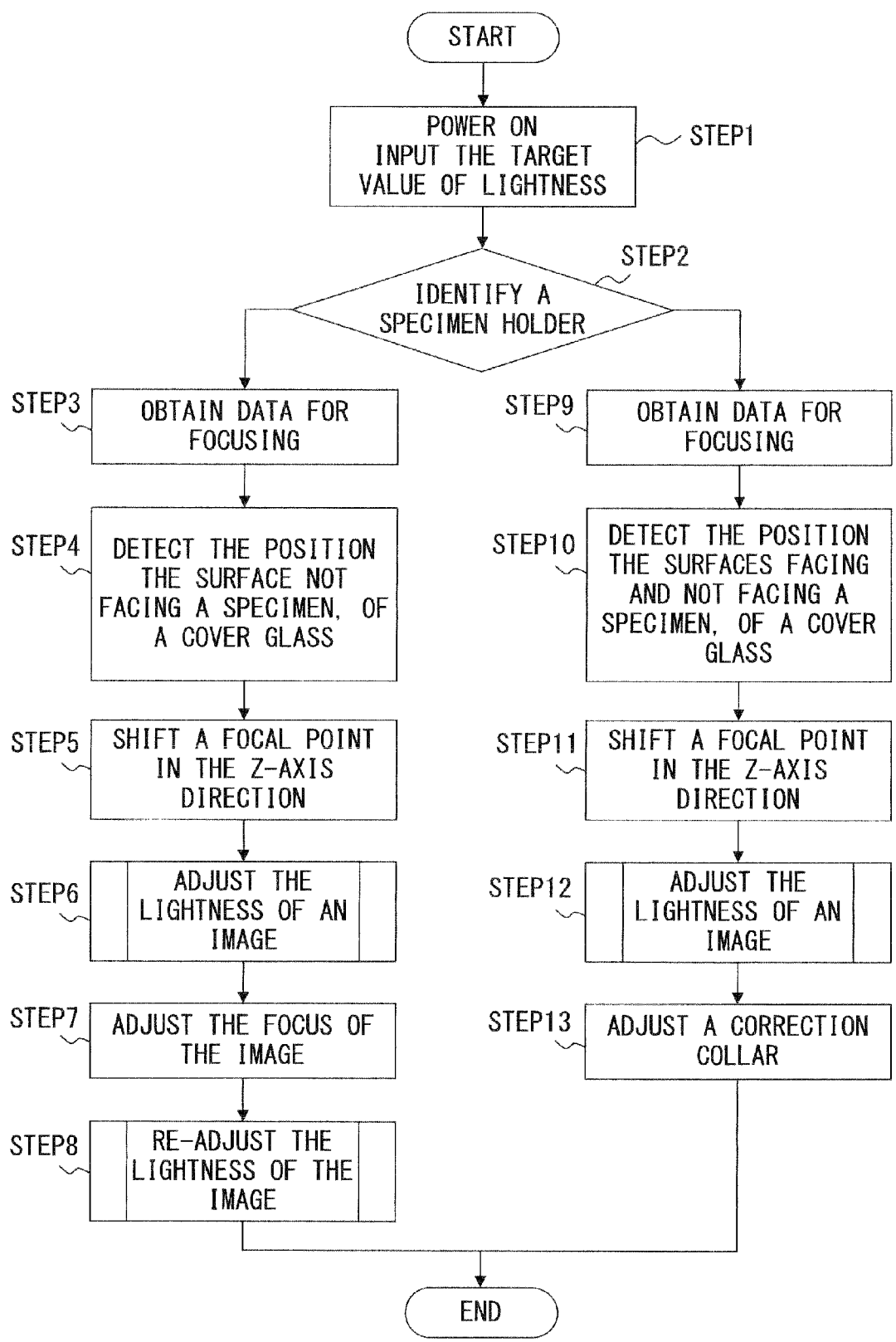
F I G. 10

100 METHOD FOR ADJUSTING LIGHTNESS OF IMAGE OBTAINED BY MICROSCOPE

CROSS REFERENCE TO RELATED APPLICATIONS

This application is based upon and claims the benefit of priority from the prior Japanese Patent Application No. 2008-274648, filed Oct. 24, 2008, the entire contents of which are incorporated herein by this reference.

BACKGROUND OF THE INVENTION

1. Field of the Invention

The present invention relates to a technology for automatically adjusting the display image of a microscope, and more particularly to a technology for automatically adjusting a display image on the basis of the lightness of the display image.

2. Description of the Related Art

For example, the lightness of an image displayed by a confocal laser fluorescent microscope varies depending on the setting of both the intensity of laser light emitted from a laser light source and the diameter of a confocal pinhole, and the setting of the amplification factor of a detector. Furthermore, the lightness of an image varies depending on a specimen being an observation target. Therefore, when a specimen is observed by a microscope, generally it becomes necessary to adjust an obtained image, which becomes a burden for the user of the microscope. Therefore, a function to automate image adjustment is desired as one function of a microscope.

Japanese Laid-open Patent Publication No. H9-138353 discloses a laser microscope for automatically adjusting the lightness of an image, that is, brightness detected by a detector. This microscope registers the setting of a microscope, for obtaining certain detection brightness in advance and obtains certain lightness of an image by adjusting the laser intensity, the amplification factor of a detector and the like, according to the setting.

However, in the technology disclosed by Japanese Laid-open Patent Publication No. H9-138353, the setting for obtaining certain detection brightness is classified and registered, for example, for each characteristic of a specimen (for example, the luminescence efficiency of a specimen against illumination light, etc.) in advance. Therefore, it becomes necessary to register setting information for each characteristic of a specimen in advance.

As to the calculation method of detection brightness being the target of automatic adjustment, various methods, such as the maximum brightness value, an average value in a screen central portion, a weighted average value (weighted average) and the like are disclosed besides the average value of the entire image. Although the differences of these methods affect the lightness of an image after automatic adjustment, neither their detailed selection criteria nor the setting of parameters (for example, weighted value, etc.) used in the various methods are not referred to.

Basically, the lightness of an image should be determined emphasizing the lightness of a part to be observed in the image. In the case of fluorescent observation by a fluorescent microscope, for example, a cell is a part to be observed. In many cases, a cell to be observed is fairly small compared with the entire screen and the position of the part in the image varies. In order to automatically adjust the image appropriately, it is necessary to obtain the lightness of a part to be observed with high precision taking these into consideration.

SUMMARY OF THE INVENTION

One aspect of the present invention is the automatic adjustment method of a microscope image, for automatically adjusting the image on the basis of the lightness of the microscope image and includes distinguishing an observation pixel to be observed in the image from a non-observation pixel not to be observed on the basis of the lightness of each pixel of the image, determining a representative value for representing the lightness of an image on the basis of the lightness of a selected pixel identified as an observation pixel and adjusting the lightness of the image on the basis of the representative value.

Another aspect of the present invention is a microscope system for automatically adjusting an image and includes a microscope unit for obtaining the image of a specimen, a control unit for analyzing the image and controlling the microscope unit on the basis of its result. The control unit includes a statistic analysis unit for obtaining both the lightness of each pixel and statistic information of the lightness from the image, a selection unit for selecting a pixel using both the lightness of each pixel and the statistic information, a determination unit for determining whether to adjust the image using the average value of the lightness of the selected pixel and an operation control unit for controlling the microscope unit on the basis of the determination result.

BRIEF DESCRIPTION OF THE DRAWINGS

The present invention will be more apparent from the following detailed description when the accompanying drawings are referenced.

FIG. 1 is a functional block diagram exemplifying the entire configuration of a microscope system according to one preferred embodiment of the present invention.

FIG. 2 typically exemplifies the image of a microscope, displaying a specimen.

FIG. 4 is a histogram exemplifying the distribution of the lightness of both an observation pixel whose fluorescence included in the image of fluorescent observation is detected, a non-observation pixel whose background light is detected, in the case where the fluorescence is sufficiently light compared with the background light.

FIG. 10 is a flowchart exemplifying the flow of a process until an image is displayed in the microscope system according to one preferred embodiment of the present invention.

DESCRIPTION OF THE PREFERRED EMBODIMENTS

Figure 3:
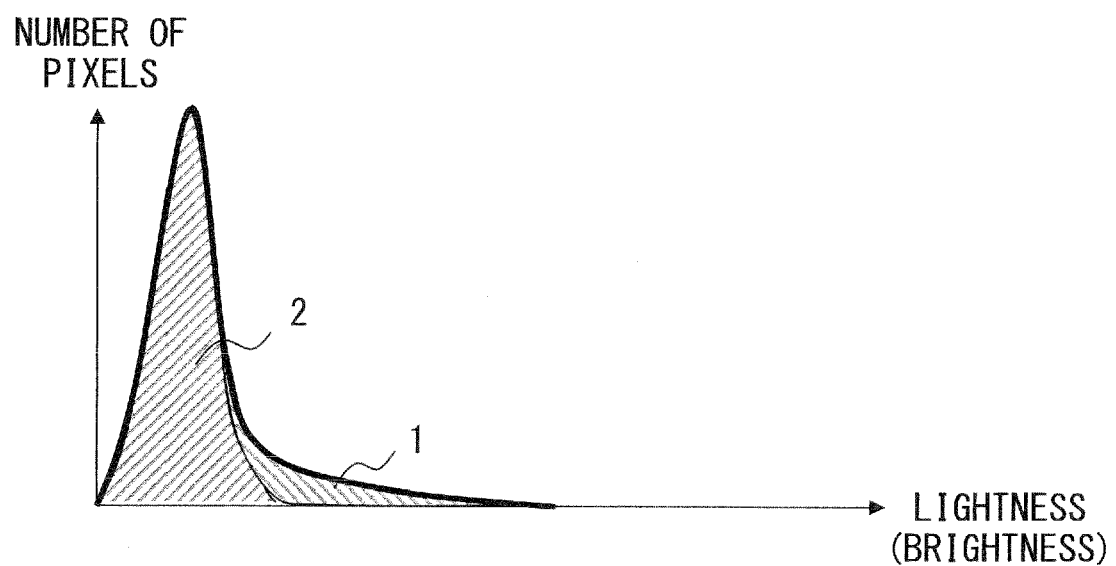
FIG. 3 is a histogram exemplifying the distribution of lightness of respective pixels of the image illustrated in FIG. 2.

Each preferred embodiment of the present invention will be explained in detail below with reference to the drawings.

FIG. 1 is a functional block diagram exemplifying the entire configuration of a system (hereinafter called "microscope system") for automatically adjusting the image of a microscope used in each preferred embodiment.

Firstly, the overall flow of control in the automatic adjustment of the microscope system will be explained.

A microscope system 100 includes a microscope unit 200 for obtaining the image of a specimen using a microscope, a control unit 300 for analyzing the image obtained by the microscope unit 200 and controlling the microscope unit 200 on the basis of its result, a display unit 400 for displaying the image of the specimen and an input unit 500 for inputting control conditions (for example, a target value, etc.) used by the control unit 300.

In the microscope system 100, the image obtained by the microscope unit 200 is outputted to the control unit 300 and the image displayed on the display unit 400 is automatically adjusted by so-called closed-loop control in which the control unit 300 controls the microscope unit 200 on the basis of the image. Therefore, no operation to register data in advance is needed to automatically adjust an image. A user can obtain the optimized image of a specimen to be observed if the user simply inputs a target value as a condition to adjust the image from the input unit 500. More specifically, it is adjusted in such a way that a value representing an image, obtained from the image (hereinafter called "representative value") may become close to a target value. In this specification, a case where the lightness (brightness) of an image (a pixel) is specified as both the target and representative values will be mainly explained.

FIG. 2 typically exemplifies the image of a microscope, displaying a specimen. FIG. 3 is a histogram exemplifying the distribution of lightness of respective pixels of the image illustrated in FIG. 2. In the histogram exemplified in FIG. 3, the horizontal and vertical axes indicate the lightness (brightness) of a pixel and the number of pixels, respectively.

Both the target and representative values of the lightness (brightness) of an image will be studied below with reference to FIGS. 2 and 3 using a case where fluorescent observation is applied to a cell specimen as an example.

As described above, basically the lightness of an image should be determined emphasizing the lightness of a part being an observation target in the image. Specifically, in FIG. 2 the target value of the lightness of an image should be determined emphasizing the lightness of a cell 1 in the image, and similarly the representative value of the lightness of an image should be calculated emphasizing the lightness of the cell 1.

However, although the cell 1 being an observation target in the image is displayed lighter than background 2, as exemplified in FIG. 2, it occupies only a part of the image. In the image, fluorescence (hereinafter called "background light" which is distinguished from fluorescence emitted from a cell) being autofluorescence is also generated from the background 2 besides fluorescence emitted from the cell 1 being an observation target. Therefore, as exemplified in FIG. 3, in a histogram where the distribution of the lightness of the entire image is exemplified, background light generated from the background 2 occupies most of it. In such an image, when the average brightness of the entire image is used as the representative value of the lightness of the image, actually the lightness of the background 2 is only adjusted and the lightness of the image cannot be appropriately adjusted.

As is clear from FIG. 2, in order to display an image appropriately adjusting its lightness, it is necessary to distinguish a pixel to be observed (hereinafter called "observation pixel") from a pixel not to be observed (hereinafter called "non-observation pixel"). Specifically, firstly, the threshold value of brightness (hereinafter called "evaluation value"), for appropriately separating an observation pixel from a non-observation pixel is determined. Then, average brightness is calculated using only pixels whose brightness is detected to be equal to or more than the evaluation value and is used as the representative value of the image. By appropriately determining the evaluation value, the representative value becomes close to brightness detected in the observation pixel, whose brightness detected in the observation pixel is emphasized. Thus, the image can be appropriately adjusted in such a way that the lightness of the cell 1 to be an observation pixel becomes close to the target value.

This calculation method of a representative value assumes that a pixel whose detected brightness is equal to or more than an evaluation value and a pixel whose detected brightness is less than the evaluation value is an observation pixel and a non-observation pixel, respectively. In this specification, in order to distinguish an actual observation pixel and an actual non-observation pixel from a pixel assumed to be an observation pixel and a pixel assumed to be a non-observation pixel, a pixel assumed to be an observation pixel and a pixel assumed to be a non-observation pixel are described as "selection pixel" and "non-selection pixel", respectively.

Taking the above into consideration, the calculation method of the representative value of the lightness of an image and an evaluation value using it will be explained in more detail below with reference to FIGS. 4 and 5.

Figure 5:
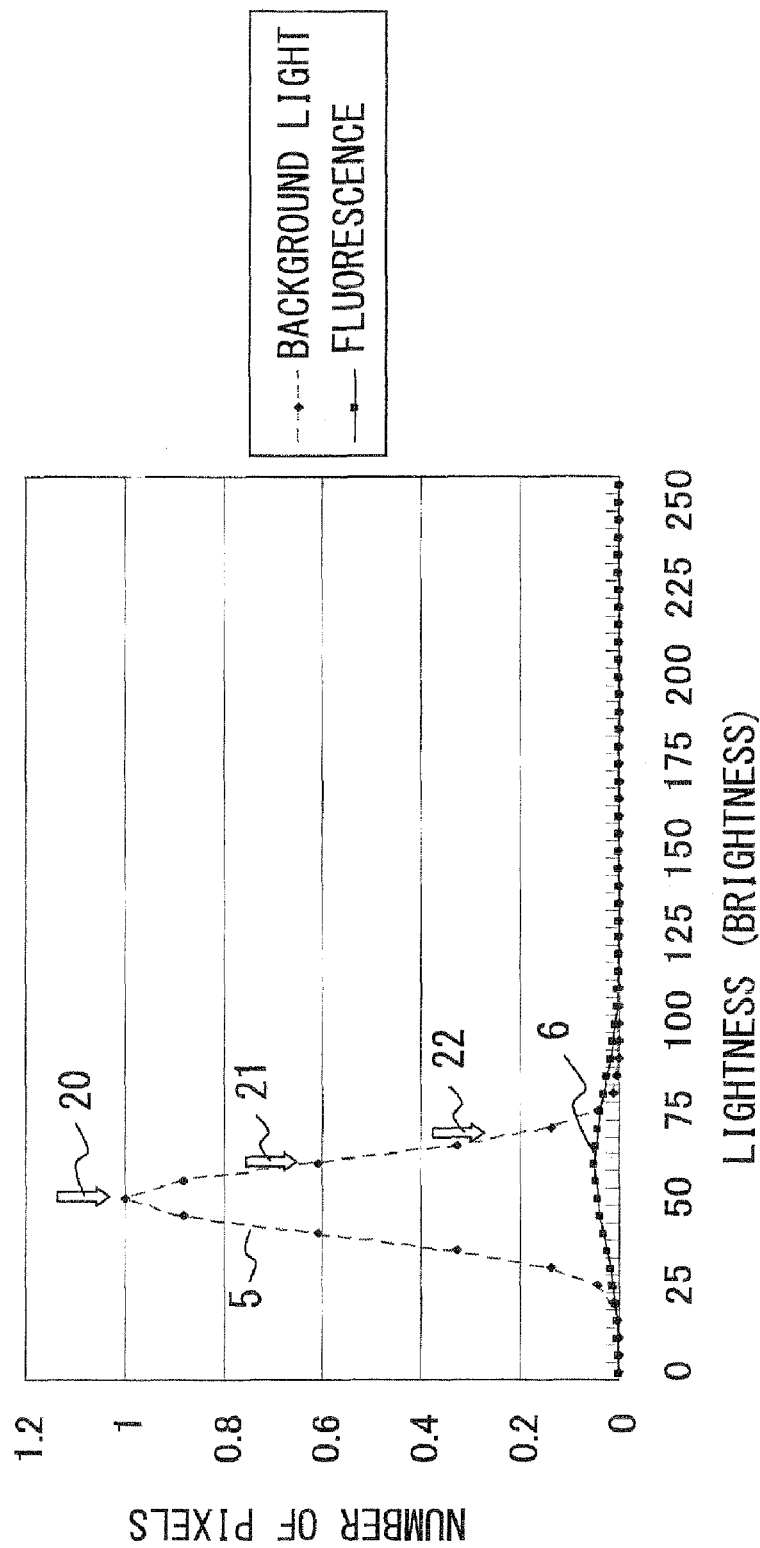
FIG. 5 is a histogram exemplifying the distribution of the lightness of both an observation pixel whose fluorescence included in the image of fluorescent observation is detected, a non-observation pixel whose background light is detected, in the case where the fluorescence is fairly dark and its lightness is close to the lightness of background light.

FIGS. 4 and 5 are histograms exemplifying the distribution of the lightness of both, in the image, an observation pixel whose fluorescence is detected and a non-observation pixel whose background light is detected, in the case where fluorescent observation is applied to a cell specimen. Its horizontal and vertical axes indicate the lightness (brightness) of an image and its number of pixels, respectively. Each axis simply indicated a relative largeness (size) in the image and its unit is not especially limited. FIG. 4 exemplifies the case where the fluorescence is sufficiently light compared with the background light. FIG. 5 exemplifies the case where the fluorescence is fairly dark and its lightness is close to the background light. Background light is generated even from an observation pixel where fluorescence is detected. Therefore, in an observation pixel, brightness whose fluorescence background light overlaps is detected. However, in a non-observation pixel, only background light is generated and is detected. As a result, in both FIGS. 4 and 5, the average brightness of an observation pixel (fluorescence) becomes higher than the average brightness of a non-observation pixel (background light). In FIGS. 4 and 5, although the graphs of fluorescence (an observation pixel) and background light (a non-observation pixel) are separately illustrated, in an actual microscope unit, fluorescence (observation pixel) and background light (non-observation pixel) are not separated and a histogram of all the pixels is obtained.

Firstly, the histogram exemplified in FIG. 4 will be studied.

In FIG. 4, background light 3 (non-observation pixel) due to auto-fluorescence is expressed by normal distribution having average lightness (brightness) of 50, standard deviation of 10 and an area of 25. However, fluorescence 4 (observation pixel) emitted from a cell is expressed by normal distribution having average lightness (brightness) of 150, standard deviation of 20 and an area of 2.5. In other words, in FIG. 4 the average lightness (brightness) of the fluorescence 4 is three times (=150/50) the average lightness of the background light 3. In fluorescent observation, an area in which the cell is displayed is small compared with the other area in the image and is usually approximately 10%. Therefore, in FIG. 4 the ratio of the area of an observation pixel to the area of a non-observation pixel is 10% (=2.5/25). Furthermore, since generally the lightness of the fluorescence 4 varies greatly compared with that of the background light 3, in FIG. 4 the standard deviation of the fluorescence 4 is made twice (=20/10) that of the background light 3.

The differences between the case where an evaluation value 10 being the average brightness of the entire image (=average brightness) is adopted as the evaluation value of the lightness of the image, the case where an evaluation value 11 obtained by adding standard deviation σ to the average brightness of the entire image (=average brightness+σ) is adopted and the case where an evaluation value 12 obtained by adding a value twice the standard deviation σ to the average brightness of the entire image (=average brightness+2σ) is adopted, will be studied below. In this case, the standard deviation σ used in the calculation of the evaluation value is the standard deviation of the lightness of all the pixels. Furthermore, since the standard deviation is a non-dimensional value, in the evaluation values 11 and 12, a value corresponding to the standard deviation σ is added to the average brightness.

When the average of the lightness (brightness) of the fluorescence 4 is sufficiently larger than that of the lightness (brightness) of the background light 3, as exemplified in FIG. 4, a non-selection pixel (pixel whose brightness is less than the evaluation value) hardly includes an observation pixel (fluorescence 4) if any of the evaluation values 10, 11 or 12 is used as a evaluation value. However, the ratio of non-selection pixels in a non-observation pixel (background light 3) becomes approximately 50%, 84% and 98% in the evaluation values 10, 11 and 12, respectively. Therefore, the ratio of non-observation pixels included in a selection pixel used to calculate a representative value (pixel whose brightness is equal to or more than the evaluation value) becomes approximately 50%, 16% and 2% in the evaluation values 10, 11 and 12, respectively. As a result, the ration of observation pixels to non-observation pixels in a selection pixel becomes the highest in the evaluation value 12, the evaluation value 11 is the second highest and the evaluation value 10 is the lowest.

This indicates that when the evaluation value 12 is used, unwanted background light 3 (non-observation pixels) can be most eliminated, a representative value emphasizing the lightness of the fluorescence 4 (observation pixel) can be calculated and as a result, an image can be optimally adjusted. Specifically, in the case of the image exemplified in FIG. 4, the evaluation value 12 (=average brightness+2σ) is most preferable, the evaluation value 11 (=average brightness+σ) is the second preferable and the evaluation value 10 (=average brightness) is the least preferable.

Similarly, the histogram exemplified in FIG. 5 will be studied.

In FIG. 5, as in FIG. 4, background light 5 (non-observation pixel) due to auto-fluorescence is expressed by normal distribution having average lightness (brightness) of 50, standard deviation of 10 and an area of 25. However, fluorescence 6 (observation pixel) emitted from a cell is expressed by normal distribution having average lightness (brightness) of 60, standard deviation of 20 and an area of 2.5. In other words, in FIG. 5 the average lightness (brightness) of the fluorescence 6 is 1.2 times (=60/50) the average lightness of the background light 5. The average values of lightness (brightness) of the fluorescence 6 and the background light 5 are close to each other compared with in FIG. 4. The other points that the ratio in area of an observation pixel to a non-observation pixel is 10% (=2.5/25) and that the standard deviation of the fluorescence 6 is twice (=20/10) that of the background light 5 are the same as in FIG. 4.

As exemplified in FIG. 5, when the average lightness (brightness) of the fluorescence 6 and the background 5 are close to each other, an area in which the distribution of the background light 5 (non-observation pixel) and the fluorescence 6 (observation pixel) are overlapped in a histogram increases. Therefore, it becomes difficult to distinguish an observation pixel from a non-observation pixel using lightness as a reference, as compared to the case shown in FIG. 4. Specifically, when more non-observation pixels (background light 5) are attempted to eliminate, a possibility of also eliminating an observation pixel (fluorescence 6) increases. Conversely, when non-observation pixels (background light 5) are attempted to eliminate in such a way as to eliminate less observation pixels (fluorescence 6), there is a possibility that non-observation pixels (background light 5) cannot be sufficiently eliminated. Therefore, it is necessary to study an evaluation value taking the balance between a merit of eliminating non-observation pixels from a selection pixel and a demerit of eliminating observation pixels from the selection pixel. Specifically, it will be studied taking into consideration, for example, three points of the unwanted amount of eliminated light which can be evaluated by the ratio of eliminated non-observation pixels, the appropriateness of the lightness of an image which can be evaluated by the ratio of observation pixels to non-observation pixels in a selection pixel and the reliability of the lightness of an image which can be evaluated by the ratio of observation pixels used as selection pixels. In this case, the appropriateness of lightness is a value indicating how much the lightness of an observation pixel is emphasized in order to calculate a representative value. The higher the value is, the more the lightness of the observation pixel can be adjusted by emphasizing it. The reliability of lightness is a value indicating how accurately the lightness of an observation pixel can be used to calculate a representative value. The higher the value is, the more sufficiently lightness of the observation pixel can be reflected in an uneven observation pixel in order to adjust an image.

The above-described three points in the case where an evaluation value 20 (=average brightness) being the average brightness of the entire image is adopted as the evaluation value of the lightness of an image, in the case where an evaluation value 21 obtained by adding standard deviation σ to the average brightness of the entire image (=average brightness+σ) is adopted and in the case where an evaluation value 22 obtained by adding a value twice the standard deviation σ to the average brightness of the entire image (=average brightness+2σ) is adopted will be studied below.

Firstly, when the evaluation value 20 is adopted, the area of an observation pixel (fluorescence 6) in a selection pixel (pixel whose brightness is equal to or more than the evaluation value) and the area of a non-observation pixel (background light 5) in a selection pixel become approximately 1.7 and just 12, respectively. In other words, the ratio of eliminated non-observation pixels, the ratio of observation pixels to non-observation pixels in a selection pixel and the ratio of observation pixels used as a selection pixel become approximately 52% (=(25−12)/25), 14% (=1.7/12) and 68% (=1.7/2.5), respectively. In this case, since approximately 70% of observation pixels are used, there is no problem in the reliability of lightness. However, as to the appropriateness of lightness, the ratio of observation pixels to non-observation pixels increases little from initial 10% up to 14% and only approximately 4% (=14−10) is improved. Furthermore, as to the elimination of unwanted light, since approximately a half of non-observation pixels are displayed, it is not sufficient. Therefore, adjustment is insufficient even as a whole.

Next, when the evaluation 22 is adopted, the area of an observation pixel in a selection pixel and the area of a non-observation pixel in a selection pixel become approximately 0.75 and 0.5, respectively. In other words, the ratio of eliminated non-observation pixels, the ratio of observation pixels to non-observation pixels in a selection pixel and the ratio of observation pixels used as a selection pixel become approximately 98% (=(25−0.5)/25), 150% (=0.75/0.5) and 30% (=0.75/2.5), respectively. In this case, although the results of both the elimination of unwanted light and the appropriateness of lightness are very good, there occurs a problem in the reliability of lightness. Specifically, only the higher 30% in lightness of observation pixels of all the observation pixels are used to calculate a representative value and the sampling of the lightness of an observation pixel is not sufficient. Therefore, image adjustment in which the lightness of the entire observation pixel is sufficiently reflected cannot be realized.

Lastly, when the evaluation 21 is adopted, the area of an observation pixel in a selection pixel and the area of a non-observation pixel in a selection pixel become approximately 1.23 and 3.68, respectively. In other words, the ratio of eliminated non-observation pixels, the ratio of observation pixels to non-observation pixels in a selection pixel and the ratio of observation pixels used as a selection pixel become approximately 75% (=(25−3.68)/25), 33% (=1.23/3.68) and 49% (=1.23/2.5), respectively. In this case, since appropriately 70% of non-observation pixels are eliminated, the result of the elimination of unwanted light is good. As to the appropriateness of lightness, the ratio of observation pixels to non-observation pixels increases from initial 10% up to 33% and is improved by 23% (=33−10). As to the reliability of lightness, since approximately 50% of observation pixels are used, the result is appropriate for sampling. In other words, adjustment balanced as a whole is realized.

Judging from these results, when the average lightness (brightness) of the fluorescence 6 as exemplified in FIG. 5 is close to the average lightness (brightness) of the background light 5, as an evaluation value, the evaluation 21 (=average brightness+σ) is the most preferable.

Judging from the above-described results in FIGS. 4 and 5, it is appropriate to use brightness (average brightness+σ) obtained by sliding the average brightness of the entire image in the lighter direction by standard deviation as an evaluation value in a general image.

Although as to the adjustment of the lightness of an image, the evaluation and representative values has been so far studied, these ways of thinking are also applicable to other than the adjustment of lightness. The case where these ways of thinking are applied to focus adjustment in which a sample comes into focus by adjusting a focal point will be explained below.

Figure 6:
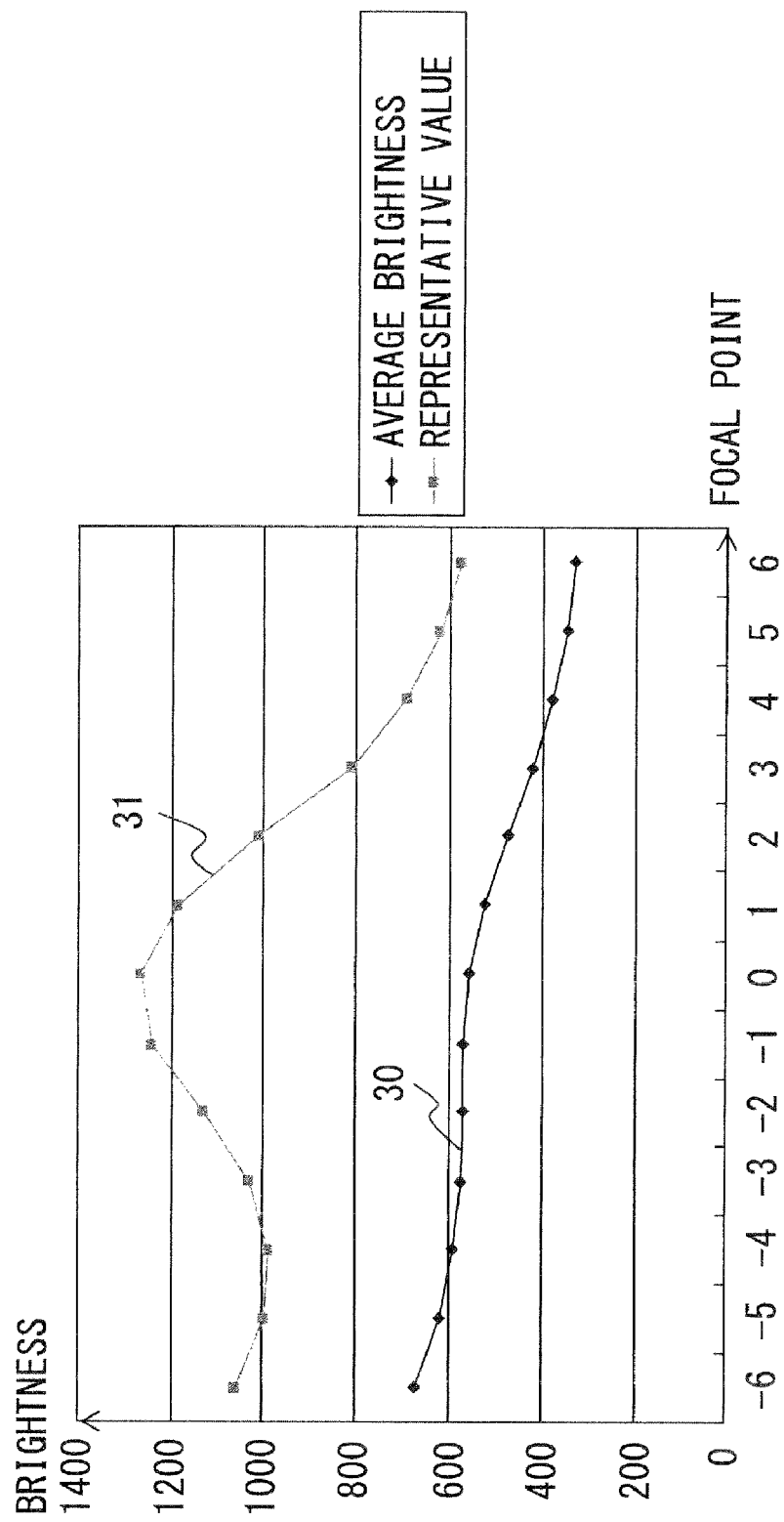
FIG. 6 exemplifies the change of the lightness of an image against a focal point in the case where fluorescent observation is applied to a cell specimen.

FIG. 6 exemplifies the change of the lightness of an image against a focal point in the case where fluorescent observation is applied to a cell specimen. The horizontal axis indicates a focal point and "0" indicates that the focal point is located on a specimen surface. The vertical axis indicates the lightness (brightness) of an image. FIG. 6 exemplifies the case where the lightness of an image is the average brightness 30 of the entire image and the case where it is a representative value 31 calculated using the above-described evaluation value.

As exemplified in FIG. 6, while a position of high brightness indicated by the average brightness 30 is a position in which the focal point is apart from the specimen surface, a position of high brightness indicated by the representative value 31 is a position in which the focal point coincides with the specimen surface. In other words, focus can be adjusted by aligning a focal point to a position in which an image has high brightness using a representative value calculated using an appropriate evaluation value.

Thus, a method for calculating the representative value of the lightness of an image selecting a pixel using the evaluation value is applicable to not only the adjustment of lightness but also focus adjustment.

A microscope system using a value obtained by adding standard deviation to the average brightness of an image as an evaluation value will be explained in detail below.

First Embodiment

A microscope system 100 according to this preferred embodiment will be explained below. Firstly, the configuration and the role of both the microscope unit 200 and control unit 300 of the microscope system 100 according to this preferred embodiment and then the automatic control of the microscope system 100 according to this preferred embodiment will be explained.

Figure 7:
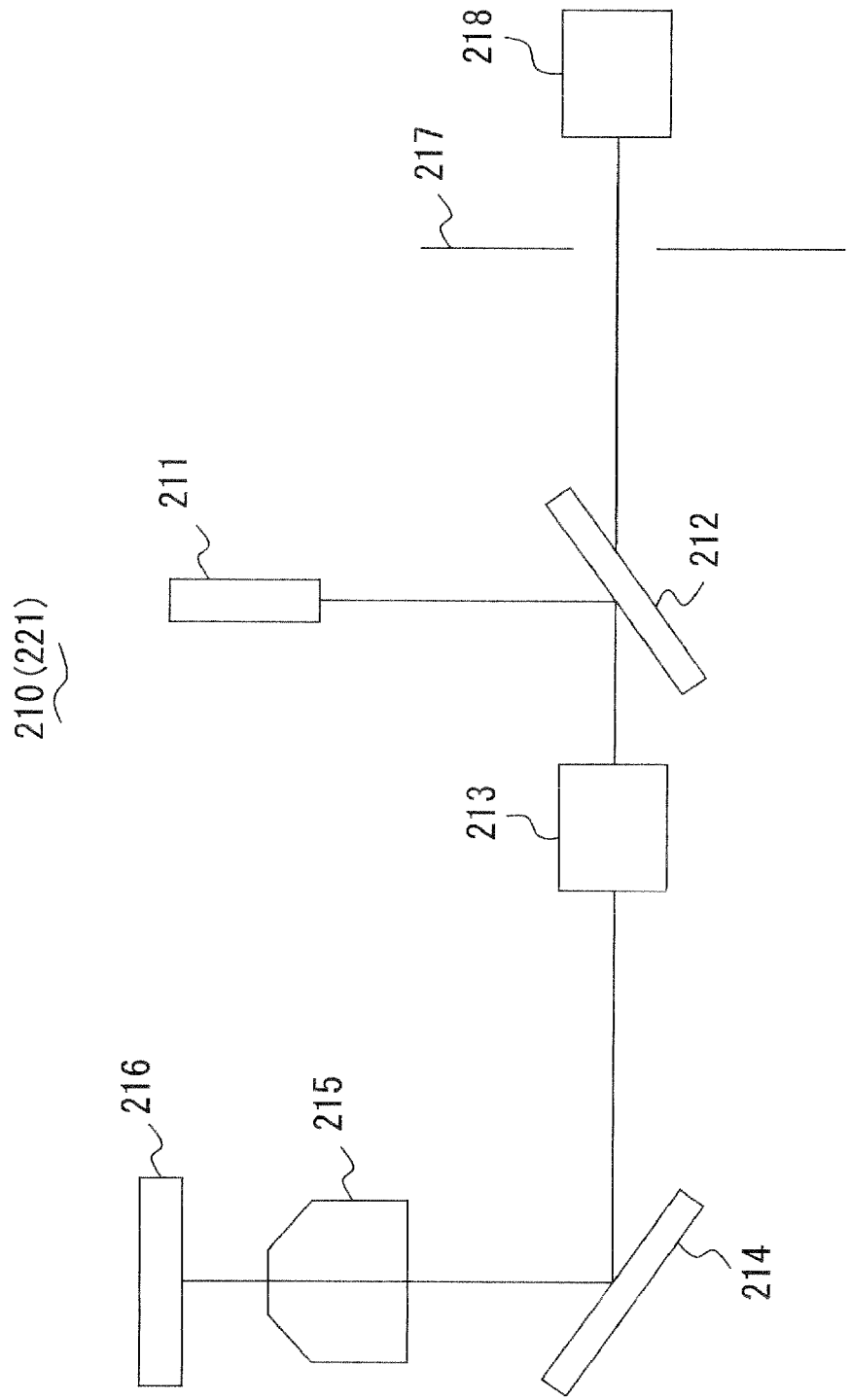
FIG. 7 exemplifies the configuration of a microscope included in the microscope unit of the microscope system according to one preferred embodiment of the present invention.
Figure 8A:
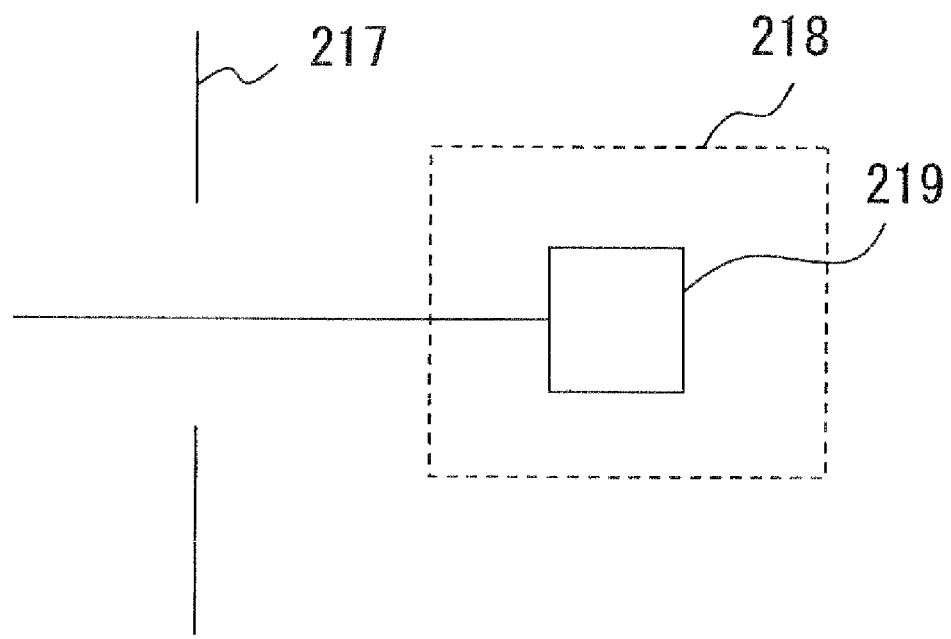
FIG. 8A exemplifies the configuration of a variation of the detection unit included in the microscope of the microscope system according to one preferred embodiment of the present invention.
Figure 8B:
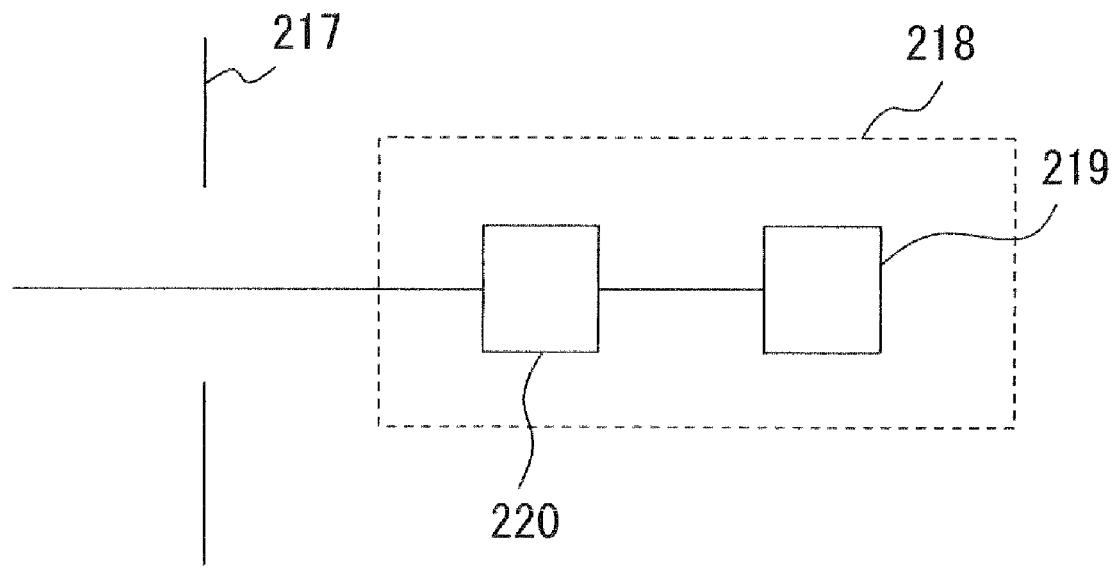
FIG. 8B exemplifies the configuration of another variation of the detection unit included in the microscope of the microscope system according to one preferred embodiment of the present invention.

FIG. 7 exemplifies the configuration of a microscope included in the microscope unit of the microscope system according to this preferred embodiment. FIGS. 8A and 8B exemplify the configuration of a detection unit included in the microscope according to this preferred embodiment.

A microscope 210 is a so-called confocal laser fluorescent microscope including a laser light source 211, a dichroic mirror 212, a scanner 213, a mirror 214, an objective 215, a specimen 216, a confocal diaphragm 217 having a confocal pin-hole and a detection unit 218.

The microscope unit 200 including the microscope 210 obtains the image of the specimen 216 and outputs it to the control unit 300. The image of the specimen 216 is obtained as follows. Laser light emitted from the laser light source 211 is reflected toward an illumination optical path on the dichroic mirror 212. The laser light reflected on the dichroic mirror 212 is radiated onto the specimen 216 via the scanner 213, the mirror 214 and the objective 215. Since the laser light radiated onto the specimen 216 functions as excitation light for exciting a fluorescent substance in the specimen 216, fluorescence is generated from the specimen 216. The fluorescence emitted from the specimen 216 advances the same optical path as that of the laser light in the opposite direction and is incident to the dichroic mirror 212. The fluorescence incident on the dichroic mirror 212 transmits through the dichroic mirror 212 unlike in the case of the laser light due to the difference of its wavelength range. Then, fluorescence from other than the focal point of the specimen 216 is blocked out by the confocal diaphragm 217 and only fluorescence from the focal point is incident to the detection unit 218. Thus the microscope 210 according to this preferred embodiment is structured in such a way that only fluorescence from the focal point is incident to the detection unit 218. Therefore, in the microscope system according to this preferred embodiment, one image of specimen 216 can be obtained by scanning the specimen 216 surface using the scanner 213 composed of a Galvano-mirror or the like.

As exemplified in FIG. 8B, the detection unit 218 can also comprise a wavelength selection unit 220 provided before the detection unit 219 instead of composing the detection unit 218 of a stand-alone detector 219, such as an photomultiplier or the like, as exemplified in FIG. 8A. This configuration is effective when a wavelength of light differs between fluorescence emitted from an observation target, such as a cell or the like, and fluorescence due to auto-fluorescence (background light). Thus, unwanted background light can be efficiently eliminated before it is incident to the detector 219, thereby making the adjustment of image easy. For such a wavelength selection unit 220, a spectro-meter, a filter for wavelength-selectively making light transmit through it or the like can be used.

Figure 9:
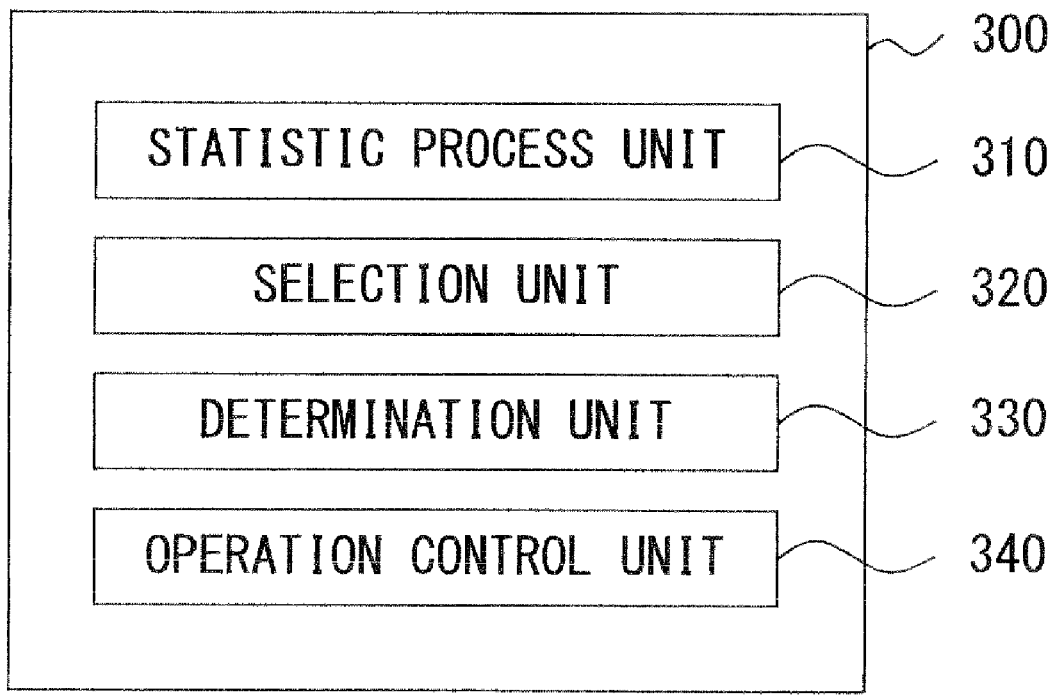
FIG. 9 exemplifies the configuration of the control unit of the microscope system according to one preferred embodiment of the present invention.

FIG. 9 exemplifies the configuration of the control unit of the microscope system according to this preferred embodiment. The control unit 300 includes a statistic process unit 310, a selection unit 320, a determination unit 330 and an operation control unit 340.

The control unit 300 analyzes the image of a specimen obtained by the microscope unit 200 and controls the microscope unit 200. The image can be outputted to the display unit 400 directly or via the control unit 300 by the microscope unit 200.

Figure 11:
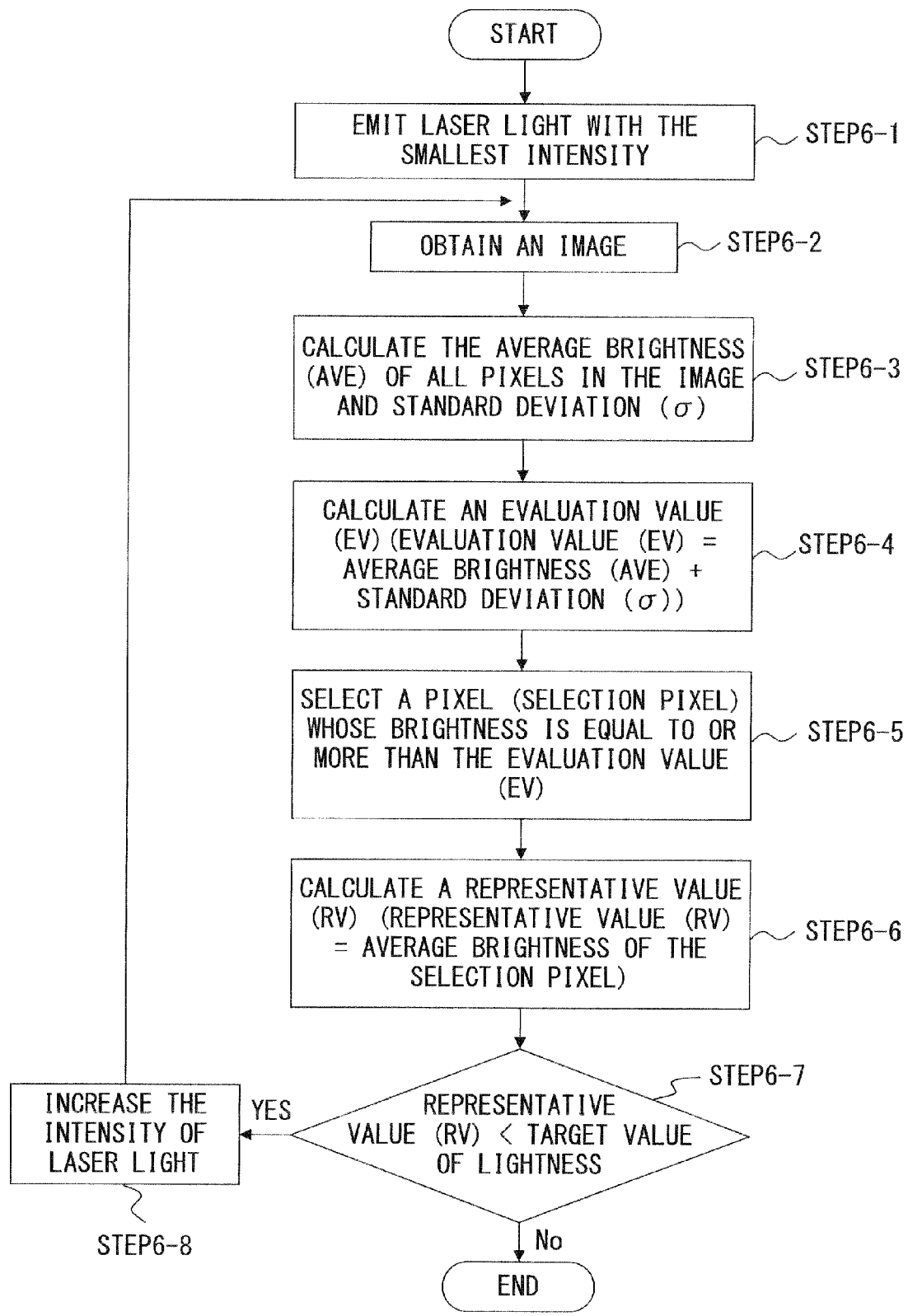
FIG. 11 is a flowchart exemplifying the flow of the adjustment process of the lightness of an image in the microscope system according to one preferred embodiment of the present invention.

FIG. 10 is a flowchart exemplifying the flow of a process until an image is displayed in the microscope system according to this preferred embodiment. FIG. 11 is a flowchart exemplifying the flow of the adjustment process of the lightness of an image in the microscope system according to this preferred embodiment.

Firstly, the overall flow until an image is displayed in the microscope system according to this preferred embodiment will be explained below with reference to FIG. 10.

Firstly, in STEP 1 the process is started by powering on the microscope 210 and inputting its initial conditions. In this case, for example, the target value of lightness and the like are inputted (STEP 1).

Then, in STEP 2 a specimen holder on which the specimen 216 is placed is identified. The microscope 210 has a plurality of specimen holders and a specimen holder to be used is determined in advance for each usage. In this case, the information of a specimen holder currently in use on the optical path is obtained. If the specimen holder is a holder for a specimen holding member in which the boundary between a specimen and a cover glass can be optically detected by a reflective index difference on the boundary surface, the process moves to STEP 9. For such a specimen holding member, a glass-bottom dish or the like is used. If it is a holder for a specimen holding member in which a reflective index difference hardly occurs on the boundary surface, such as when slide glass is used for the specimen holding member, the process moves to STEP 3.

In STEPs 3, 4 and 5, a focusing process for aligning a focal point onto the specimen 216 surface is performed as a preparation before starting the observation of the specimen 216.

Firstly, in STEP 3, information for aligning a focal point onto the specimen 216 surface is obtained. Specifically, the information of the intensity (I) of reflection light against the Z-axis (Z) (hereinafter called "I-Z profile") is obtained while shifting the focal point in the Z-axis direction (the optical axis direction) before and after the cover glass.

In STEP 4, the position of a surface not facing the specimen 216, of the cover glass (hereinafter called "non-specimen side surface") using the I-Z profile is detected. The non-specimen side surface of the cover glass usually touches the air. Therefore, reflection light occurs on the non-specimen side surface according to the reflective index difference between the air and the cover glass. Thus, the position of the non-specimen side surface can be detected as a position in which the intensity of the reflection light increases, on the I-Z profile.

In STEP 5, the focal point is shifted to a position obtained by moving it in the Z-axis direction by the standardized thickness of the cover glass from the non-specimen side surface of the cover glass. Specifically, it can be made by driving the stage of the microscope 210 in the Z direction and the like. This is because since the specimen 216 contacts a side surface facing the specimen of the cover glass (hereinafter called "specimen side surface") and the thickness of the cover glass (that is, width in the Z-axis direction) is standardized, it is considered that the specimen 216 surface exists in a position obtained by moving it in the Z-axis direction by the standardized thickness of the cover glass from the non-specimen side surface of the cover glass.

Then, in STEP 6, the image of the specimen 216 is obtained and the lightness of the image is adjusted. In this case, the lightness of the image is adjusted in cooperation with the microscope unit 200 and the control unit 300, using the above-described principle. Its details will be described later with reference to FIG. 11.

In STEP 7, the focal point is re-adjusted after the lightness adjustment. At this moment, as described above, the focal point is adjusted to a position in which the representative value of the image has high brightness, using the evaluation and representative values.

Lastly, in STEP 8, the lightness of the image is re-adjusted by the same process in STEP 6. Thus, an image whose lightness and focal point is appropriately adjusted is displayed on the display unit 400.

If the process moves to STEP 9, in STEPs 9, 10 and 11 a focusing process for aligning the focal point onto the specimen 216 surface is performed as a preparation before starting the observation of the specimen 216.

In STEP 9, an I-Z profile is obtained in the same way as in STEP 3.

In STEP 10, the positions of both the specimen side surface and non-specimen side surface, of the cover glass are detected using the I-Z profile. In STEP 10, since, for example, a glass-bottom dish or the like is used, unlike in the case in STEP 4, a substance whose reflective index is different from that of the cover glass also exists on the specimen side surface of the cover glass in addition to its non-specimen side surface. Thus, in the I-Z profile, respective reflection light generated on the specimen and non-specimen side surfaces of the cover glass can be distinguished and the position of the specimen 216 surface on the specimen side surface of the cover glass can be detected.

In STEP 11, the focal point is shifted to the specimen side surface of the cover glass or a position obtained by off-setting it by a predetermined value. This predetermined value, for example, is approximately several micrometers and is used to align the focal point to inside the specimen taking the thickness of the specimen 216 into consideration.

In STEP 12, in the same way as in STEP 6, the image of the specimen 216 is obtained and the lightness of the image is adjusted. Then, in STEP 13, the image finally adjusted using a correction collar. Thus, an image whose lightness and focal point are appropriately adjusted is displayed on the display unit 400.

So far the overall flow until an image displayed has been described.

Next, a process for automatically adjusting the lightness of an image will be explained in more detail with reference to FIG. 11.

It is preferable to the process for adjusting the lightness of an image, exemplified in FIG. 11 after the focusing process, as exemplified in FIG. 10. STEPs 6-1, 6-2 and 6-8 are executed by the microscope unit 200. However, STEPs 6-3 through 6-7 are executed by the control unit 300.

Firstly, the laser light source 211 emits laser light. At this moment, the intensity of the emitted laser light is set to the lowest value (STEP 6-1). Then, the image of the specimen 216 is obtained by scanning the specimen 216 surface as described above (STEP 6-2). The obtained image is outputted from the microscope unit 200 to the control unit 300.

Then, the image is processed by the statistic process unit 310 in the control unit 300. In the statistic process unit 310, firstly both the average brightness (AVE) of all pixels in the image and the standard deviation ($\sigma$) of brightness distribution are calculated (STEP 6-3). Furthermore, an evaluation value (EV) obtained by lightening the average brightness (AVE) by the standard deviation ($\sigma$) is calculated (STEP 6-4).

Then, a pixel, whose brightness is equal to or more than the evaluation value (EV) is selected as a selection pixel by the selection unit 320 (STEP 6-5).

In determination unit 330, firstly the average brightness of the selection pixel is calculated as a representative value (RV) representing the lightness of the image (STEP 6-6). Then, the representative value (RV) and the target value of lightness inputted in STEP 1 of FIG. 10 are compared and it is determined whether the lightness of the image is appropriate (STEP 6-7). If the representative value (RV) is less than the target value, the operation control unit 340 instructs the microscope unit 200 (laser light source 211) to increase laser intensity and the process moves to STEP 6-8. If the representative value (RV) is equal to or more than the target value, the adjustment of lightness is terminated.

When receiving the instruction from the operation control unit 340, the microscope unit 200 (laser light source 211) increase laser intensity (STEP 6-8) and obtains the image again (STEP 6-2). After that, the above-described process is repeated until the representative value (RV) reaches the target value. Thus, the lightness of the image is automatically and appropriately adjusted.

As described above, according to the microscope system in this preferred embodiment, both the lightness and focus of an image can be automatically adjusted without preparing data or the like in advance. Thus, an image can be automatically adjusted without giving excessive work load to the user of a microscope. An image can be more appropriately adjusted by calculating the representative value of the lightness of an image, used to automatically adjust the image emphasizing an observation target in the image.

<First Variation of First Embodiment>

Then, a variation of the microscope system exemplified in the first preferred embodiment will be explained. This variation of the microscope system has two or more colors of fluorescence excited by laser light of one wavelength unlike the first preferred embodiment and is used when it is necessary to simultaneously observe two colors of fluorescence.

The configuration of the microscope 221 included in a microscope system according to this variation is the same as that of the microscope 210 according to the first preferred embodiment exemplified in FIG. 7 except for the internal configuration of the detection unit 218. The configuration of a control unit included in the microscope system according to this variation is the same as that of the control unit 300 in the first preferred embodiment exemplified in FIG. 9. Its differences from the first preferred embodiment will, be explained below.

Figure 12:
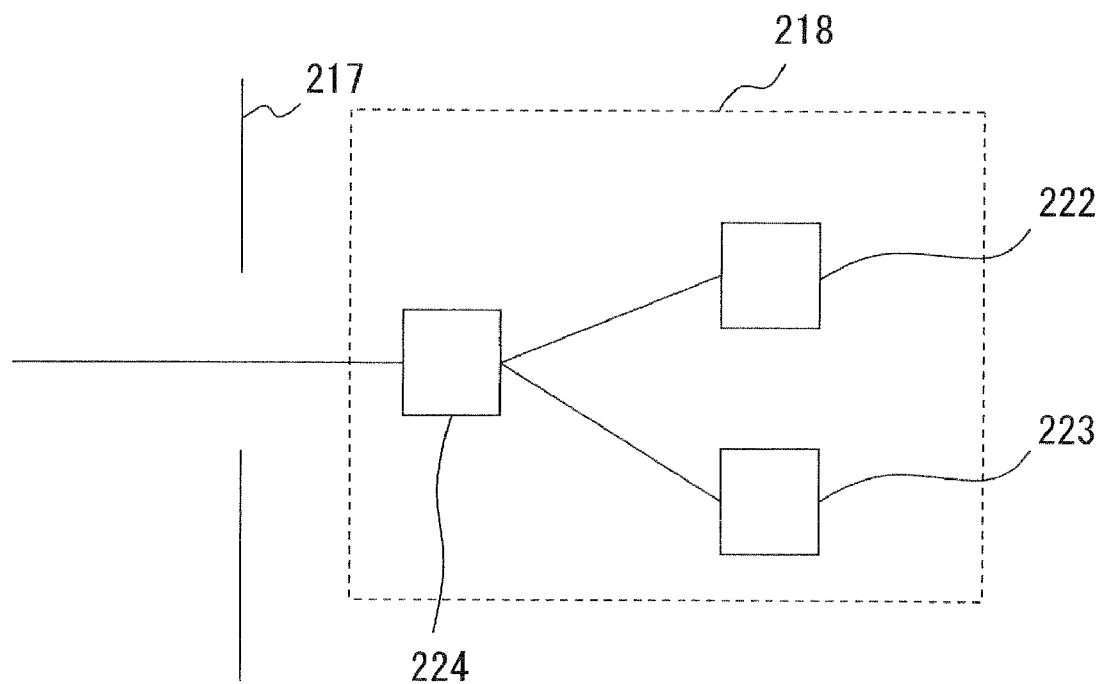
FIG. 12 exemplifies the configuration of still another variation of the detection unit included in the microscope of the microscope system according to one preferred embodiment of the present invention.

FIG. 12 exemplifies the configuration of the detection unit 218 in the microscope 221 of this variation. The detection unit 218 of the microscope 221 includes two detectors 222 and 223, and a wavelength selection unit 224. Thus, two colors of fluorescence can be separately detected by separating them by the wavelength selection unit 224 and leading them to different detectors.

However, in an image(s) including two colors of fluorescence, it is necessary to independently adjust the lightness of respective fluorescence. Therefore, there is a possibility that when as in the first preferred embodiment, laser intensity is adjusted and an image including one fluorescence is appropriately adjusted, an image including the other fluorescence is not always appropriately adjusted.

Therefore, in this variation, the lightness of an image(s) including two colors of fluorescence is adjusted as follows. Light incident to the detectors 222 and 223 give histograms exemplified in FIGS. 4 and 5, respectively. Therefore, the fact that the representative value of lightness is calculated using the above-described evaluation value in each of them is the same. Thus, the lightness of an image (fluorescence) can be appropriately adjusted as in the first preferred embodiment.

Then, the adjustment of laser light intensity is repeated on the basis of the representative value of an image including one fluorescence (for example, image detected by the detector 222). Thus, the lightness of an image including one fluorescence, detected by the detector 222 is appropriately adjusted. Then, an image including the other fluorescence, detected by the detector 223 is adjusted. In this case, since the image detected by the detector 222 is already appropriately adjusted, the intensity of laser light is not changed. The lightness of the image including the other fluorescence is modified by modifying the setting of the detector 223. For example, when the detector 223 is a photomultiplier, the setting of its amplification factor is modified.

As described above, in the microscope system in this variation, as in the first preferred embodiment, the representative value of the lightness of an image used when it is adjusted is calculated emphasizing an observation target in the image. Then, an image(s) including two colors of fluorescence can be appropriately adjusted by individually adjusting the setting of a detector in addition to the intensity of laser light.

Although two colors of fluorescence is explained as an example this time, this is also applicable to three or more colors of fluorescence. Specifically, it is OK if the seine number of detectors as the number of fluorescence is provided and then the lightness of one and the other colors is adjusted by the intensity of laser light and the setting of detectors, respectively.

Second Embodiment

A microscope system according to this preferred embodiment will be explained below. The configuration of the control unit 300, overall flow until an image is displayed, adjustment method of the lightness of an image of the microscope system according to this preferred embodiment are the same as those of the first preferred embodiment exemplified in FIGS. 9, 10 and 11, respectively. Therefore, only its differences from the first preferred embodiment will be explained below.

Figure 13:
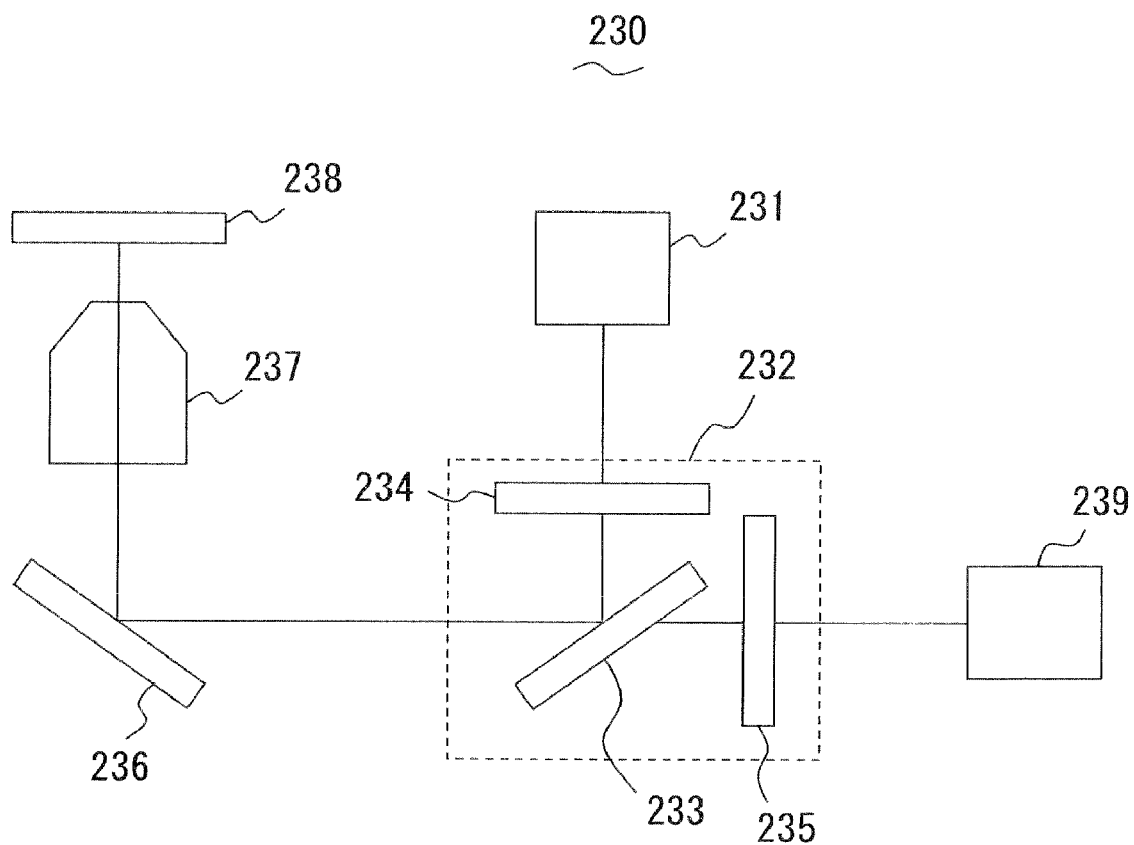
FIG. 13 exemplifies the configuration of another variation of the microscope unit included in the microscope of the microscope system according to one preferred embodiment of the present invention.

In the microscope system according to this preferred embodiment, the configuration of the microscope 200 differs from that of the first preferred embodiment. FIG. 13 exemplifies the configuration of the microscope included in the microscope unit of the microscope system according to this preferred embodiment.

A microscope 230 is a fluorescent microscope and includes a light source 231 for excitation, such as a mercury lamp or the like, a fluorescent filter cube 232, a mirror 236, an objective 237, a specimen 238 and a detector unit 239. The fluorescent filter cube 232 is composed of a dichroic mirror 233 and two filters (an exciter filter 234 and an absorption filter 235). The detection unit can detect light having both less background light and highly efficient fluorescence by their appropriate combination.

The flow until the image of the specimen 238 is obtained by the microscope unit 200 including the microscope 230 will be explained below. Excitation light including various wavelengths outputted from the light source 231 is firstly incident to the exciter filter 234 in the fluorescent filter cube 232. The exciter filter 234 extracts light having a wavelength needed to excite a fluorescence substance in the specimen 238. Therefore, it transmits only excitation light having a specific wavelength necessary for excitation and inputs it to the dichroic mirror 233. The excitation light incident to the dichroic mirror 233 is reflected by the dichroic mirror 233 and irradiates the specimen 238 via both the mirror 236 and the objective 237. The specimen 238 is excited by the excitation light and generates fluorescence. The fluorescence emitted from the specimen 238 advances the same optical path as the excitation light in the opposite direction and is incident to the fluorescent filter cube 232. The fluorescence incident to the dichroic mirror 233 in the fluorescent filter cube 232 transmits through the dichroic mirror 233 due to the difference of a wavelength range unlike the excitation light and is incident to the absorption filter 235. The absorption filter 235 eliminates unwanted light, such as background light and the like, from incident light. Therefore, it transmits fluorescence having less background light and inputs it to the detection unit 239. Thus, the microscope 230 according to this preferred embodiment can obtain the image of the specimen 238.

The detection unit 239 can also be configured as exemplified in FIGS. 8A and 8B, like the first preferred embodiment. Alternatively, it can be configured as exemplified in FIG. 12, like the variation of the first preferred embodiment.

As described above, the microscope system of this preferred embodiment can also obtain the same effect as the first preferred embodiment by automatically adjusting an image in the same way as the first preferred embodiment.

Although the present invention has been so far explained using a fluorescent microscope as an example, the type of a microscope is not limited to a fluorescent microscope. It is OK if a certain relationship (difference) in lightness between a pixel being an observation target (observation pixel) and a pixel not being an observation target (non-observation pixel) exist and such an image can be the targets of all microscopes. Furthermore, it is not always necessary that a pixel being an observation target is lighter than a pixel not being an observation target. When a pixel being an observation target is dark, it is OK if a dark pixel is processed as a selection pixel.

The present invention is not limited to the above-described preferred embodiments and can be variously modified without departing from its spirit.

What is claimed is:

1. A method for adjusting a lightness of an image obtained by a microscope, the method comprising:
   obtaining, by a microscope unit that comprises the microscope, an image of a specimen;
   calculating, by a control unit, a lightness as an evaluation value;
   distinguishing, by the control unit, an observation pixel which is an observation target in the image from a non-observation pixel which is not an observation target, based on the evaluation value and a lightness of each pixel of the image;
   determining, by the control unit, a representative value for representing the lightness of the image based on a lightness of a selection pixel which has been identified as the observation pixel; and
   giving, by the control unit, an instruction to change an intensity of a light source of the microscope unit so as to bring the representative value close to a predetermined lightness, and adjusting, by the microscope unit, the intensity of the light source in accordance with the instruction from the control unit to adjust the lightness of the image.

2. The method according to claim 1, wherein the evaluation value is calculated using two or more statistic indexes obtained from the image.

3. The method according to claim 2, wherein the two or more statistic indexes comprise an all-pixel average value, which is an average value of lightness of all pixels in the image, and a standard deviation of the lightness of all pixels in the image.

4. The method according to claim 3, wherein the evaluation value is higher than the all-pixel average value by a lightness corresponding to the standard deviation.

5. The method according to claim 1, wherein a pixel which has a lightness equal to or more than the evaluation value is selected as the selection pixel.

6. The method according to claim 1, wherein the representative value is an average value of lightness of a plurality of selection pixels.

7. The method according to claim 1, further comprising adjusting an amplification factor of a detector of the microscope.

8. The method according to claim 1, further comprising inputting information of the predetermined lightness before adjusting the lightness of the image.

9. The method according to claim 1, wherein the image is obtained before distinguishing the observation pixel from the non-observation pixel.

10. The method according to claim 1, further comprising adjusting a focal point of the microscope before distinguishing the observation pixel from the non-observation pixel.

11. The method according to claim 1, further comprising adjusting a focal point of the microscope by shifting the focal point to a position in which the representative value is highest after adjusting the lightness of the image.

12. The method according to claim 1, wherein the microscope is a fluorescent microscope.

13. The method according to claim 12, wherein the microscope is a confocal laser fluorescent microscope.

* * * * *